(12) United States Patent
Chamberlin et al.

(10) Patent No.: US 10,169,621 B2
(45) Date of Patent: Jan. 1, 2019

(54) MULTIMEDIA PIPELINE ARCHITECTURE

(71) Applicant: TiVo Solutions Inc., San Carlos, CA (US)

(72) Inventors: David Chamberlin, Pacifica, CA (US); Rajasekhar Reddy Koduri, Alviso, CA (US); Aleksander Bakowski, Alviso, CA (US)

(73) Assignee: TiVo Solutions Inc., San Jose, CA (US)

( * ) Notice: Subject to any disclaimer, the term of this patent is extended or adjusted under 35 U.S.C. 154(b) by 24 days.

(21) Appl. No.: 14/670,393

(22) Filed: Mar. 26, 2015

(65) Prior Publication Data

US 2015/0281297 A1 Oct. 1, 2015

Related U.S. Application Data

(60) Provisional application No. 61/970,894, filed on Mar. 26, 2014, provisional application No. 61/975,001, filed on Apr. 3, 2014.

(51) Int. Cl.
*G06F 15/16* (2006.01)
*G06F 21/85* (2013.01)
(Continued)

(52) U.S. Cl.
CPC .......... *G06F 21/85* (2013.01); *G06F 12/0866* (2013.01); *G06F 12/1408* (2013.01);
(Continued)

(58) Field of Classification Search
CPC ...... G06F 21/85; G06F 12/1408; G06F 21/10; G06F 2112/402; G06F 2221/0784; H04L 65/4084; H04L 65/80; H04L 67/2842
(Continued)

(56) References Cited

U.S. PATENT DOCUMENTS 5,485,579 A * 1/1996 Hitz ............... G06F 15/173
709/203
5,572,645 A * 11/1996 Dan ............... G06F 3/0601
345/501

(Continued)

FOREIGN PATENT DOCUMENTS

| JP | 8-106418 | 4/1996 |
| JP | 2007-68111 | 3/2007 |
| WO | WO 2000/07368 | 2/2000 |

OTHER PUBLICATIONS

World Intellectual Property Organization, Application No. PCT/US2015/22861, International Search Report dated Jul. 23, 2015.

(Continued)

*Primary Examiner* — Michael Won
(74) *Attorney, Agent, or Firm* — Haley Guiliano LLP

(57) ABSTRACT

A media content pipeline architecture is described that enables media devices to efficiently receive, store, play, and stream media content. In general, a media content pipeline as described herein is configured to receive media content streams from one or more input sources, segment and store the media content streams into fixed-sized or variable-sized data buffers, encrypt the data stored in the buffers, and store the encrypted data in an in-memory buffer cache for further processing. The media content pipeline further may be configured to write the encrypted buffers stored in the in-memory buffer cache to a secondary storage device (e.g., a hard disk) in response to the occurrence of one or more defined operating conditions. The media content pipeline may enable a media device to efficiently receive and process media content data streams, write the media content data streams to storage, and stream the media content data to client devices.

21 Claims, 7 Drawing Sheets

(51) Int. Cl.
*G06F 12/14* (2006.01)
*H04L 29/06* (2006.01)
*H04L 29/08* (2006.01)
*G06F 21/10* (2013.01)
*G06F 12/0866* (2016.01)
*H04N 21/4147* (2011.01)
*H04N 21/432* (2011.01)
*H04N 21/433* (2011.01)
*H04N 21/443* (2011.01)

(52) U.S. Cl.
CPC .......... *G06F 21/10* (2013.01); *H04L 63/0428* (2013.01); *H04L 65/4084* (2013.01); *H04L 65/80* (2013.01); *H04L 67/2842* (2013.01); *H04N 21/4147* (2013.01); *H04N 21/432* (2013.01); *H04N 21/433* (2013.01); *H04N 21/4433* (2013.01); *G06F 2212/402* (2013.01); *G06F 2221/0784* (2013.01)

(58) Field of Classification Search
USPC ....................................................... 709/203
See application file for complete search history.

(56) References Cited

U.S. PATENT DOCUMENTS

| | | | | |
|---|---|---|---|---|
| 6,209,024 B1* | 3/2001 | Armstrong | ............ | G06F 3/0611 709/212 |
| 6,381,746 B1* | 4/2002 | Urry | ............... | H04N 21/21 348/E5.008 |
| 6,483,838 B1* | 11/2002 | Ostman | ............... | H04L 12/5601 370/395.31 |
| 6,519,693 B1* | 2/2003 | Debey | ................. | G09B 5/065 348/E5.108 |
| 6,536,043 B1* | 3/2003 | Guedalia | ................. | H04N 7/147 348/E7.071 |
| 6,892,244 B2* | 5/2005 | De Roose | ............. | H04M 15/00 707/999.2 |
| 6,937,599 B1* | 8/2005 | Yoshida | ............ | H04L 12/40058 370/390 |
| 7,454,120 B2 | 11/2008 | Putterman et al. | | |
| 7,502,796 B2* | 3/2009 | Parkkinen | ......... | G06F 17/30575 |
| 7,548,962 B2* | 6/2009 | Weber | ................... | G06Q 30/02 709/219 |
| 7,668,914 B2* | 2/2010 | Parker | ................ | H04N 7/17318 370/256 |
| 7,681,222 B1* | 3/2010 | Sorensen | ........... | H04N 7/17318 725/91 |
| 7,853,981 B2* | 12/2010 | Seo | ................... | H04N 7/17318 709/231 |
| 8,624,908 B1 | 1/2014 | Knee et al. | | |
| 2001/0013128 A1* | 8/2001 | Hagai | ............... | H04N 7/17318 725/90 |
| 2001/0040886 A1* | 11/2001 | Jimenez | ........... | G06F 17/30775 370/352 |
| 2002/0143973 A1* | 10/2002 | Price | ................ | H04L 29/06027 709/231 |
| 2002/0161911 A1* | 10/2002 | Pinckney, III | .... | H04N 21/6587 709/231 |
| 2002/0174430 A1 | 11/2002 | Ellis et al. | | |
| 2002/0188692 A1 | 12/2002 | Horiuchi | | |
| 2004/0068745 A1* | 4/2004 | Yamamoto | ........ | H04N 7/17318 725/87 |
| 2004/0198223 A1* | 10/2004 | Loh | ........................ | H04L 47/10 455/41.1 |
| 2004/0260828 A1* | 12/2004 | Price | ................ | H04L 29/06027 709/231 |
| 2005/0132418 A1* | 6/2005 | Barton | ................. | G11B 27/002 725/134 |
| 2005/0193235 A1* | 9/2005 | Sandorfi | ............ | G06F 11/1448 714/6.12 |
| 2007/0033419 A1* | 2/2007 | Kocher | ................. | G06F 21/10 713/193 |
| 2010/0332754 A1* | 12/2010 | Lai | ....................... | G06F 3/0625 711/118 |
| 2011/0060812 A1 | 3/2011 | Middleton | | |
| 2011/0246616 A1 | 10/2011 | Ronca et al. | | |
| 2013/0019025 A1* | 1/2013 | Chaturvedi | ....... | H04L 29/06517 709/231 |
| 2013/0067036 A1 | 3/2013 | Nooney et al. | | |
| 2013/0166922 A1* | 6/2013 | Wong | ..................... | G06F 21/10 713/193 |
| 2014/0068096 A1 | 3/2014 | Shivadas et al. | | |
| 2014/0068789 A1 | 3/2014 | Watts | | |
| 2014/0314233 A1* | 10/2014 | Evans | .................... | H04N 21/83 380/210 |
| 2015/0281297 A1* | 10/2015 | Chamberlin | ........ | G06F 12/1408 709/219 |
| 2016/0142457 A1* | 5/2016 | Karthikeyan | ......... | H04L 12/185 709/219 |

OTHER PUBLICATIONS

World Intellectual Property Organization, Application No. PCT/US2015/22861, Pending Claims as of Jul. 23, 2015.
U.S. Appl. No. 09/332,244, filed Jun. 11, 1999, Ellis et al.

\* cited by examiner

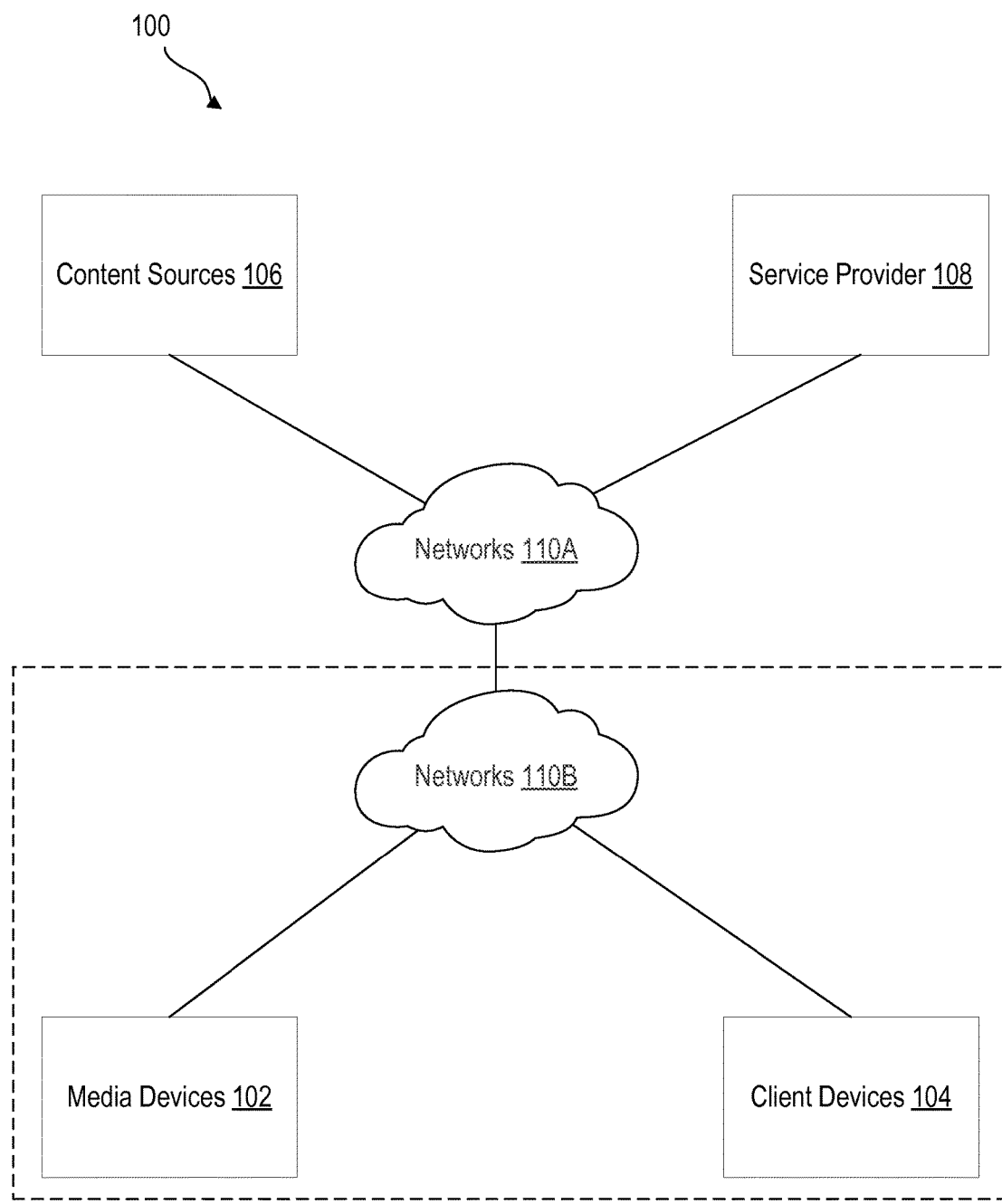

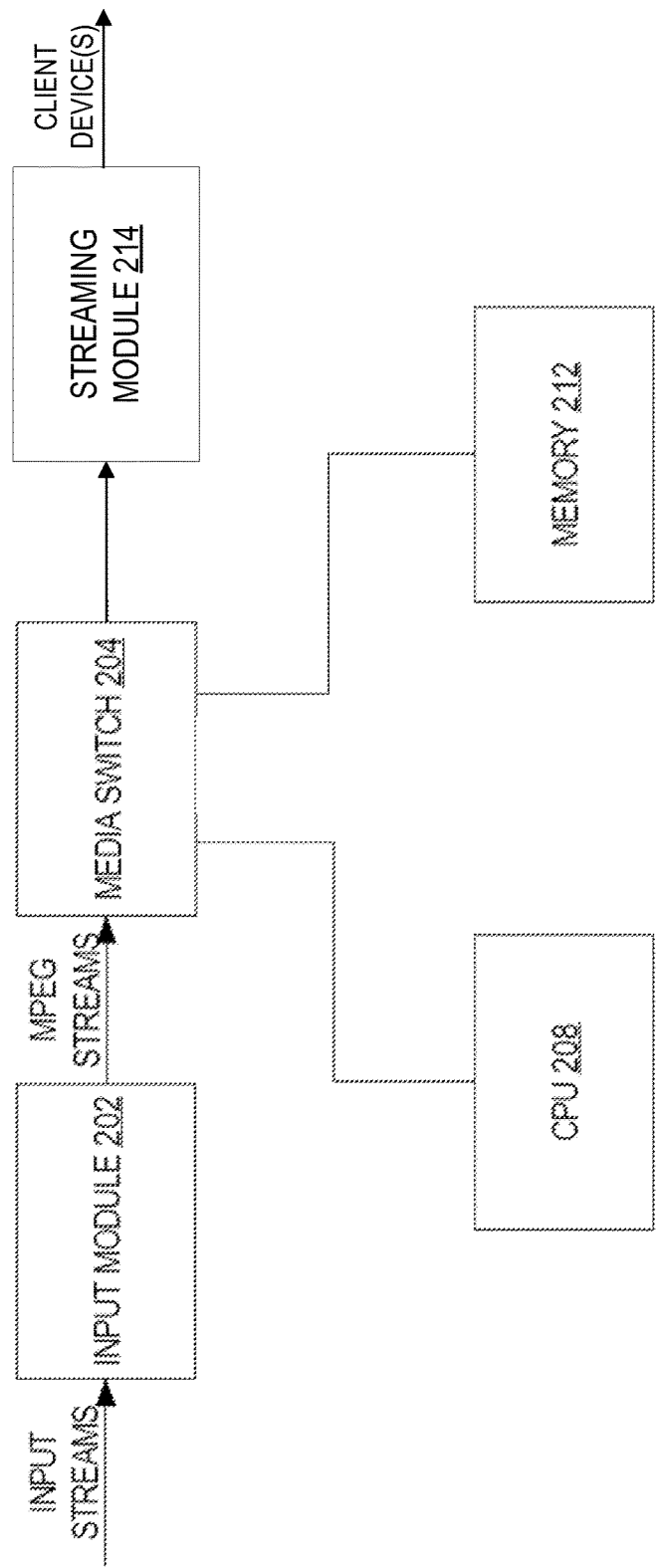

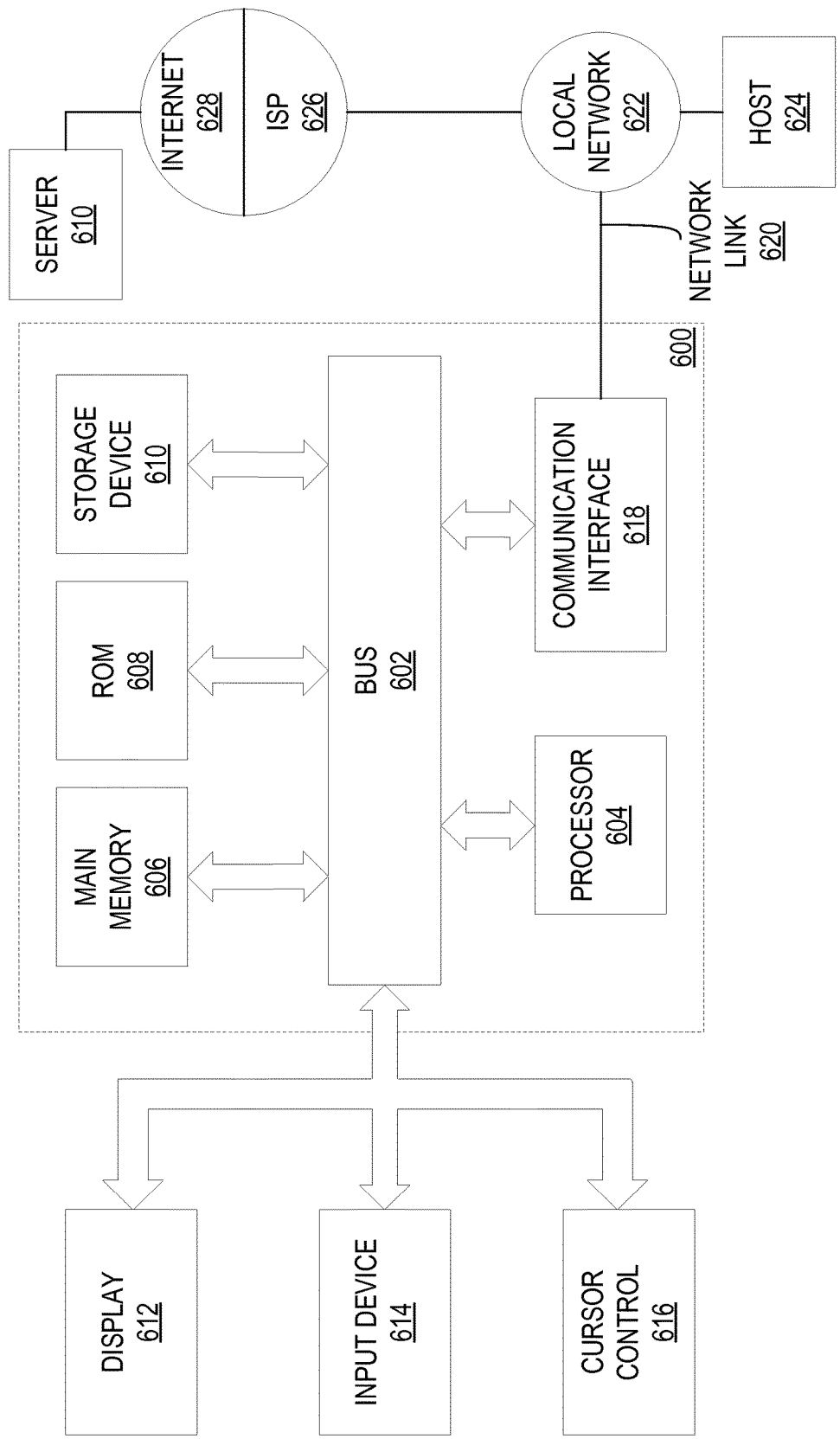

MULTIMEDIA PIPELINE ARCHITECTURE

PRIORITY CLAIM

This application claims benefit of Provisional Appln. 61/970,894, filed Mar. 26, 2014, and Provisional Appln. 61/975,001, filed Apr. 3, 2014, the entire contents of which is hereby incorporated by reference as if fully set forth herein, under 35 U.S.C. § 119(e).

TECHNICAL FIELD

Embodiments relate generally to processing media content by a media device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media devices, such as digital video recorders (DVRs), set-top boxes (STBs), portable media devices, etc., receive various types of media content from over-the-air broadcasts, satellite broadcasts, cable channels, etc., and enable users to play, record, and otherwise interact with the media content. In some arrangements, a "host" media device may be configured to receive content from one or more content sources and stream the content to one or more "client" media devices. For example, the host media device may be a DVR in a user's living room and the client media devices may include other DVRs, media servers, mobile devices, etc., that are located in other areas of the user's house or elsewhere.

Current media content streaming systems typically include a host media device that receives streamable media content from a content source, stores the media content on a local hard disk or other secondary storage device, and streams the media content to one or more client devices from the storage device. Because media content is streamed to client devices from secondary storage devices in these systems, the less time it takes for a host media device to write media content streams to secondary storage, the sooner the content is available for streaming to client devices. Thus, delays in the time taken for a host media device to receive and store media content to disk may result in unsatisfactory user experiences at client devices streaming media content from a host media device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating an example system for processing media content by a media device, in accordance with one or more embodiments;

FIG. 2B is a block diagram illustrating an example streaming media device, in accordance with one or more embodiments;

FIG. 6 is block diagram of a computer system upon which embodiments of the invention may be implemented.

DETAILED DESCRIPTION

Figure 2A:
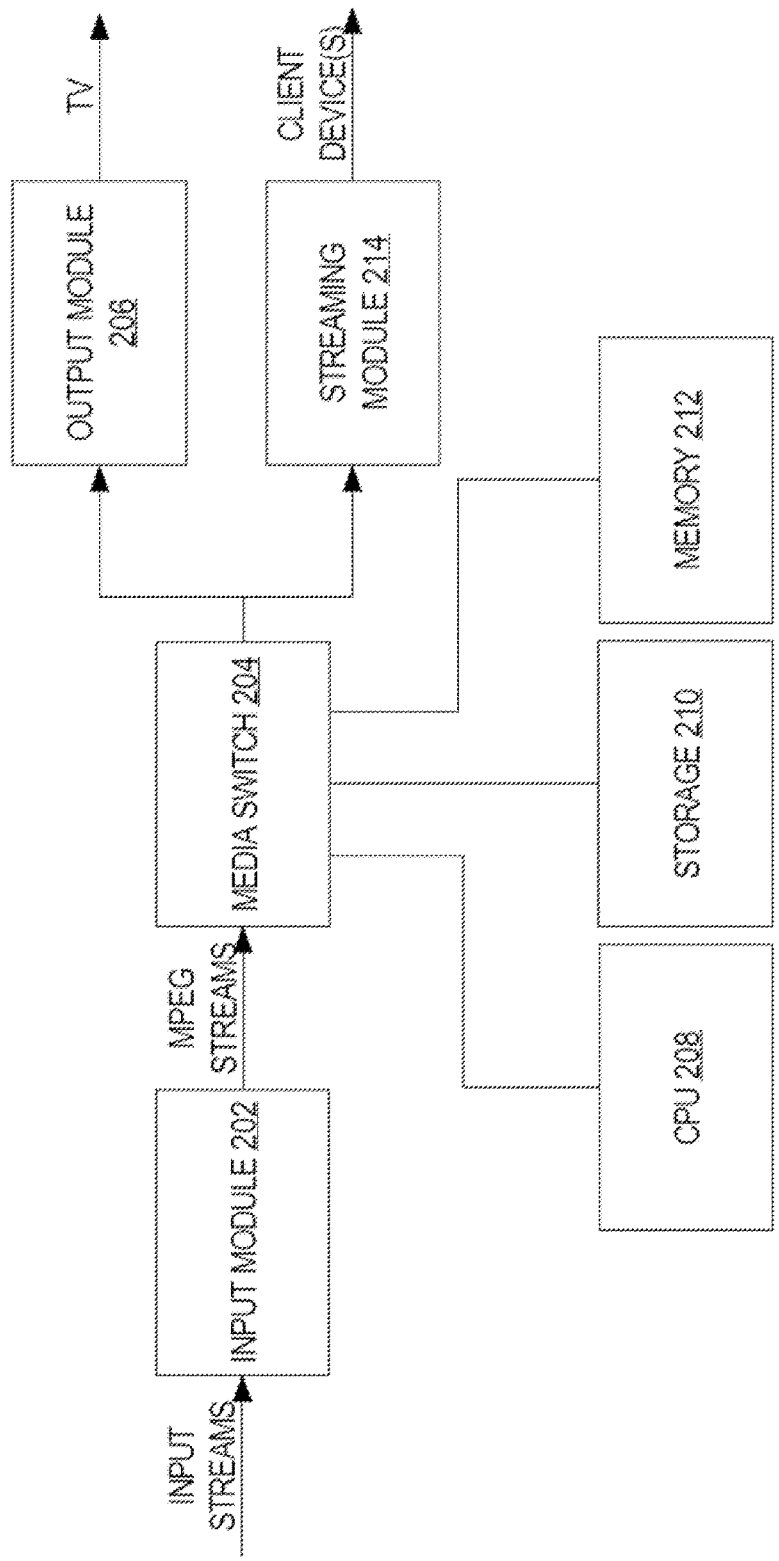
FIG. 2A is a block diagram illustrating an example media device, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0. General Overview
   2.0. Structural Overview
   3.0. Example Media Devices
   4.0 Example Media Content Pipeline Architecture
   5.0. Implementation Examples
      5.1. Media Content Processing
      5.2. Playing Media Content At A Media Device
      5.3 Media Content Streaming
   6.0. Implementation Mechanism—Hardware Overview
   7.0. Extensions and Alternatives

1.0. General Overview

Approaches, techniques, and mechanisms are disclosed for processing media content by a media device. According to various embodiments, a media content pipeline architecture is described that enables media devices to efficiently receive, store, play, and stream media content. In general, a media content pipeline as described herein is configured to receive media content streams from one or more input sources, segment and store the media content streams into fixed-sized or variable-sized data buffers, encrypt the data stored in the buffers, and store the encrypted data in an in-memory buffer cache for further processing. The media content pipeline further may be configured to write the encrypted buffers stored in the in-memory buffer cache to a secondary storage device (e.g., a hard disk) in response to the occurrence of one or more defined operating conditions.

According to approaches described herein, a media content pipeline is configured to improve a host media device's ability to stream media content received by the host media device to other client media devices. In some implementations, before a host media device streams media content to a client device, the host device receives, processes, and stores the media content to a secondary storage device as the media content is received. The media content is then read from the secondary storage device and sent to requesting client devices. Thus, one option for improving a host media device's ability to rapidly stream media content to client devices is for the host media device to more frequently write portions of incoming media content streams to local storage at the media device. For example, by increasing the frequency with which portions of incoming media content streams are written to local storage, those portions of the media content streams may be made available for streaming to client devices sooner. However, writing portions of media content streams to storage is a relatively expensive operation, both in terms of the time to complete each write operation and physical wear on a storage device. Furthermore, host media devices may receive several media content streams at the same time and, thus, any increases in the frequency of writing portions of the media content streams to a storage device may dramatically increase the total number of write operations over time.

A method and computer apparatus are disclosed for streaming media content by a host device to other client devices for playback by the client devices. In general, a media content pipeline architecture as described herein efficiently processes and manages incoming media content streams so that the content streams are rapidly made available for streaming while reducing the frequency of write operations to secondary storage. According to one embodiment, a media device receives a plurality of media content data streams. At least a portion of a particular media content stream of the plurality of media content data streams is stored in one or more in-memory buffers, and the one or more in-memory buffers are encrypted. A request for the particular media content stream is received from a client device, the request indicating a position within the particular media content stream. In response to determining that the position within the media content stream corresponds to a particular buffer of the one or more in-memory data buffers, the particular buffer is sent to the client device. By enabling a media device to manage portions of media content streams in a cache of encrypted in-memory buffers and to provide buffers from the cache in response to streaming requests from client devices, the frequency of writing the buffers to secondary storage may be reduced.

In an embodiment, subsequent to encrypting the one or more in-memory buffers, the one or more in-memory buffers are stored to a secondary storage device.

In an embodiment, the in-memory buffers are encrypted in response to determining that one or more unencrypted in-memory buffers have reached an encryption limit, wherein the encryption limit is one or more of a time limit and a number of unencrypted in-memory buffers currently stored.

In an embodiment, wherein the one or more in-memory buffers are stored at the secondary storage device in response to determining that a write limit is reached, wherein the write expiration limit is one or more of a time limit and a number of encrypted in-memory data buffers currently stored.

In an embodiment, wherein the position within the particular media content stream is indicated by a timestamp or a buffer order number.

In an embodiment, wherein the one or more in-memory buffers are a uniform size.

In an embodiment, wherein at least one buffer of the one or more in-memory buffers is padded with non-media content data.

In other aspects, the invention encompasses a computer apparatus and a computer-readable medium configured to carry out the foregoing steps.

2.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components. Although a specific system is described, other embodiments are applicable to any system that can be used to perform the functionality described herein.

In an embodiment, the system 100 includes one or more media devices (e.g., media device 102), one or more client devices (e.g., client device 104), one or more content sources (e.g., content sources 106), and one or more service providers (e.g., service provider 108). Components of the system 100 may be connected via one or more networks (e.g., networks 110A, 110B). Networks 110A, 110B may be implemented by any medium or mechanism that provides for the exchange of data between components of the system 100. Examples of networks 110A, 110B include, without limitation, a network such as a Local Area Network (LAN), Wide Area Network (WAN), wireless network, the Internet, Intranet, Extranet, etc. Any number of devices within the system 100 may be directly connected to each other through wired or wireless communication segments.

In an embodiment, a media device 102 generally may refer to any type of computing device that is capable of receiving media content items, such as television programs, movies, video on demand (VOD) content, etc., from a cable signal, terrestrial signal, digital network-based data, etc. Examples of media device 102 include, without limitation, a digital video recorder (DVR), media server, set-top box, digital media receiver, etc.

A media device 102 generally may include one or more tuners configured to receive media content from various content sources 106. A tuner may refer to, but is not limited to, any of: a video tuner, an audio tuner, an audiovisual tuner, a CableCARD, a system resource unit, a system component, a signal processing unit, etc. which can be provisioned, tuned, allocated, assigned, used, etc., (e.g., on demand, in advance, etc.) by the media device 102 to receive media content from content sources 106. For example, one content source 106 may include a live television feed. Other example content sources 106 include, but are not limited to, Video On Demand (VOD) libraries, third party content providers (e.g., Netflix® or Amazon Prime®), and web-based media content.

In an embodiment, a client device 104 generally represents any device capable of playing media content. Examples of a client device 104 include, without limitation, digital video recorders (DVR), tablet computers, handheld devices (e.g., cellular phones, etc.), laptops, e-readers, personal computing devices, game devices, etc. In general, client device 104 may refer to any type of computing device that is capable of receiving media content over one or more digital networks 110, such as the public Internet, but which may or may not include a TV-tuner input. A user typically may own several media devices 102 and client devices 104 which may be located at various locations throughout a user's home and elsewhere.

In some embodiments, a media device 102 and a plurality of client devices 104 may be located in multiple rooms of a building such as a home and connected to one or more local area networks (LANs) (e.g., a network 110B). For example, one media device 102 may be located in a user's living room and a client device 104 may be located in another room in the user's house. As one example, a client device 104 may be a tuner-less streaming device that is configured to stream media content from a media device 102 over one or more networks 110B and to play the streamed media content on an output device (e.g., a TV) connected to the client device 104. Media device 102 may receive the media content that is streamed to a client device 104 from one or more media content sources 106.

In one embodiment, a media device 102 may support one or more streaming protocols that allow client devices 104 to access media content over one or more networks 110B. Example streaming protocols include, without limitation, TiVo Multi-Room Streaming (MRS), HTTP Live Streaming (HLS), other standard or proprietary streaming protocols, etc.

In an embodiment, media devices 102 and client devices 104 may communicate with one or more service providers 108 via one or more networks 110A, 110B. A service provider 108 generally may host and otherwise provide access to information such as program guide data, graphical resources (such as fonts, pictures, etc.), service information, software, advertisements, and other data that enables media devices 102 and/or client devices 104 to satisfy user search requests for media content items, generate and display graphical user interfaces, and perform other operations.

System 100 illustrates only one of many possible arrangements of components configured to provide the functionality described herein. Other arrangements may include fewer, additional, or different components, and the division of work between the components may vary depending on the arrangement. Each component of system 100 may feature an open port, API, or other suitable communication interface by which the component may become communicatively coupled to other components of system 100 as needed to accomplish any of the functions of system 100 described herein.

3.0 Example Media Devices

FIG. 2A is a block diagram illustrating an example of the internal structure and operation of a media device, in accordance with one or more embodiments. An example of the internal structure and operation of a media device, such as a digital video recorder (DVR), is further described in U.S. Pat. No. 6,233,389, owned by the Applicant, which is incorporated by reference as though originally disclosed herein.

The media device shown in FIG. 2A comprises an input module 202, a media switch 204, an output module 206, and a streaming module 214. Input module 202 receives television (TV) and other media content input streams in any of a variety of forms via one or more input tuners. In an embodiment, an analog TV input stream received by input module 202 may take the form of a National Television Standards Committee (NTSC) compliant signal or a PAL compliant broadcast signal. In another embodiment, a digital broadcast input stream received by input module 202 may take a digital form that includes, but is not limited to, any of: MPEG2, MPEG4, etc., received from sources that include, but are not limited to, any of: CableCARD, satellite, terrestrial, etc. In one embodiment, input module 202 receives analog media content input streams and produces MPEG formatted streams. In one embodiment, input module 202 receives digital media content streams and transcodes the digital media content streams to another digital format. In another embodiment, input module 202 produces streams that are encoded using a different codec.

An MPEG transport multiplex supports multiple programs in the same broadcast channel, which may include multiple video and audio feeds and private data. Input module 202 tunes the channel to a particular program, extracts a specified MPEG stream from the channel, and feeds the MPEG stream to the rest of the system. Analog TV signals are encoded into a similar MPEG format using video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 202 and passed to the other modules as if the signals had been delivered via an MPEG private data channel.

Input module 202 may also receive streaming content from network sources such as local or remote NAS storage devices, Internet content providers, local or remote media devices, etc. The content streams received may be in many different formats such as MPEG, MPEG 2, MPEG 4, WMV, AVCHD, MOV, H.264, MKV, etc. Input module 202 may produce MPEG streams corresponding to the received content streams.

In an embodiment, the media device can accommodate multiple input modules 202 (e.g., tuners), each of which can be tuned to different types of input. For example, one tuner may be receiving an analog TV signal at the same time that another tuner is receiving digital input from an Internet source. Similarly, the media device can accommodate multiple output modules 206 (e.g., decoders). The multiple decoders may be used, for example, to concurrently output the same or different content to multiple display devices or to implement various special effects such as picture-in-picture (PiP).

In an embodiment, a media switch 204 manages data transfers between a microprocessor CPU 208, storage 210, and memory 212. Memory 212 generally represents primary memory of the media device 102 that may be directly accessible by CPU 208 and other components of media device 102. Storage 210 generally represents a secondary storage device of the media device 102 that generally may not be directly accessible by CPU 208. Examples of storage 210 include, without limitation, a hard disk, flash memory, etc.

In an embodiment, a media switch 204 may embed or otherwise associate time sequence information with incoming content streams. The time sequence information may be stored with the stream as a series of time stamps. These time stamps, for example, may be monotonically increasing and start at zero each time the system boots up. This allows other components of the system to more easily find particular locations within a content stream. For example, if the system receives a request to read five seconds into an incoming content stream, the system may simply start reading forward in the stream and locate the corresponding time stamp.

In an embodiment, an index may be created as a content stream is processed by the system. For example, the index may track the I frames (for MPEG streams) in the stored content stream which enables the system to quickly perform trick play functions such as fast forwarding, rewinding, variable rate fast forwarding, variable rate rewinding, frame stepping, etc. For example, if a user desires to start playback at a play position that is in the middle of a media content stream, the system may find the I frame closest to the midpoint of the content stream using the index and display the content stream beginning at that I frame, thereby obtaining the desired results with a minimal amount of information.

In an embodiment, an input module 202 converts input streams to an MPEG stream and sends the MPEG streams to a media switch 204 for further processing. In general, a media switch 204 may perform one or more operations involving input streams received by the media device concurrently. For example, if a user of the media device is watching a live television program, media switch 204 may process and send a media content stream to output module 206 and concurrently cause the media content stream to be written to storage 210.

In an embodiment, an output module 206 receives media content streams as input and produces an output display signal that can include any digital or analog format compatible with devices that include, but are not limited to, any of: digital monitors, digital televisions, analog televisions, computers, smart phones, tablets, etc. Output module 206 may comprise an MPEG decoder, an on-screen display (OSD) generator, a digital or analog display signal encoder, and audio logic. The OSD generator allows the program logic to supply images which may be overlaid on top of the resulting output display signal. Additionally, output module 206 can modulate information supplied by the program logic onto the VBI (for analog devices) of the output signal in a number of standard formats, including NABTS, CC, and EDS.

In an embodiment, a streaming module 214 receives requests from client devices for particular media content streams, retrieves the data for the requested media content from storage 210 and/or memory 212, and sends the media content streams to the requesting client devices. For example, streaming module 214 may receive requests from client devices and send media content streams to client devices via one or more wired or wireless network links. In one embodiment, a network interface of streaming module 214 may be configured to access media content data directly from memory 212 using direct memory access (DMA).

FIG. 2B is a block diagram illustrating an example of the internal structure and operation of a streaming media device, in accordance with one or more embodiments. The example streaming media device may be similar to the media device illustrated in FIG. 2A, except some components of the media device in FIG. 2A may be reduced or absent (e.g., an output module 206 and storage 210). As illustrated in FIG. 2B, an example streaming media device may comprise an input module 202, a media switch 204, CPU 208, memory 212, and a streaming module 214. By reducing the number of components present in a streaming media device as illustrated in FIG. 2B, for example, a lower cost device can be produced that is focused on streaming media content to other client devices.

In one embodiment, an input module 202 of a streaming media device may receive input from any number of sources including analog TV input streams, digital broadcast input streams, and network sources. As another example, a streaming media device may receive input from other media devices, such as a media device illustrated in FIG. 2A. In this arrangement, a streaming media device may operate separately from another media device to stream content from the media device to other client devices.

4.0 Example Media Content Pipeline Architecture

Figure 3:
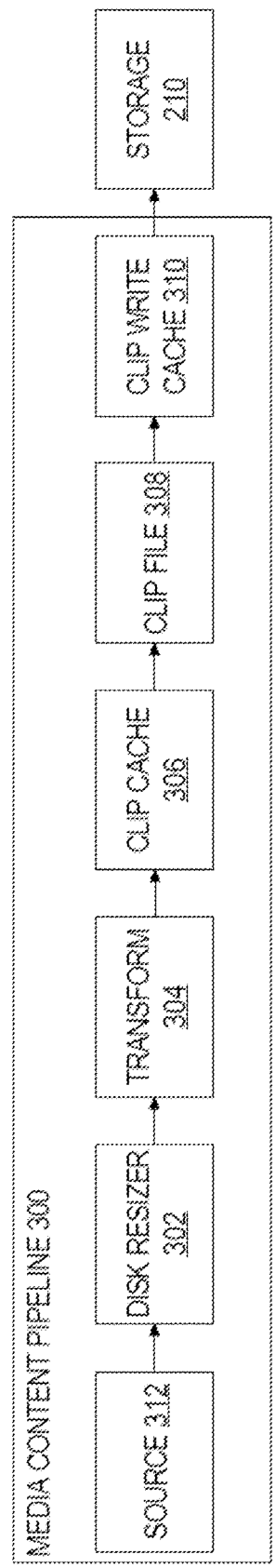
FIG. 3 is a block diagram illustrating an example media content pipeline, in accordance with one or more embodiments.

FIG. 3 is a block diagram illustrating an example media content pipeline, in accordance with one or more embodiments. In FIG. 3, a media content pipeline 300 is represented as a series of data processing modules collectively configured to receive, buffer, cache, encrypt, and store media content streams received from one or more input modules 202, among other features. In one embodiment, a media content pipeline 300 comprises processing modules including a source 312, disk resizer 302, transform 304, clip cache 306, clip file 308, and clip write cache 310. Conceptually, each of these processing modules handshake media content stream buffers received from one or more input modules 202 through the media content pipeline 300.

In an embodiment, a source 312 represents program logic configured to retrieve data from data sources that may include, but are not limited to, any of a tuner, a streaming content server, a URL, a Network Access Storage (NAS), a set top box, a media device, video server, pay per view source, video on demand source, etc., and send the data to the rest of the media content pipeline 300 for processing. In one embodiment, a source 312 sends data retrieved from a data source to a disk resizer 302 which apportions the data into buffers, as described hereinafter.

In an embodiment, a disk resizer 302 receives media content data from a source 312 and segments the media content data into separate data buffers. In this context, a buffer generally represents a region of memory from a memory pool that can temporarily store portions of an incoming media content stream. The data stored in the buffers may subsequently undergo various processing steps by other components of a media content pipeline 300. Each of the buffers may, for example, store an approximately uniform amount of media content data (e.g., 64 KB, 128 KB, or 1 MB), where the buffer size may be chosen for convenience of storage on a secondary storage device and/or for other processing steps of a media content pipeline 300.

In an embodiment, a disk resizer 302 requests empty buffers from a transform 304 to fill with portions of media content data received from a source 312. For example, if a transform 304 is configured to allocate buffers in 128 KB blocks, then disk resizer 302 may segment media content data streams received from a source 312 into 128 KB segments, request one or more empty buffers from a transform 304, and store the 128 KB segments in the empty buffers. By configuring a media content pipeline 300 to operate on media content streams as a collection of uniform sized segments stored in data buffers, downstream processing of the streams may be made more efficient. In other examples, buffers may be allocated in variable sizes depending on storage optimization and bit rates of the media content data.

In an embodiment, if a current buffer is not already available for disk resizer 302 to store media content data received from a source 312, the disk resizer 302 requests the transform 304 to allocate a new buffer from a buffer memory pool stored in memory 212. In one embodiment, each tuner of a media device may be associated with a separate media content pipeline, and the memory pool may be configured with a particular amount of memory available to each pipeline. A transform 304 may create a new buffer for use by an associated media content pipeline 300, for example, by calling a system function that creates the buffer from available space in the memory pool. As a disk resizer 302 receives media content data from a source 312, the disk resizer 302 stores a portion of the data in the current buffer along with any metadata, the metadata providing descriptive information about the media content stored in the buffer.

In general, a disk resizer 302 stores media content data received from a source 312 in the current buffer until the current buffer is "full" (e.g., if a buffer is created to store 128 KB of data, the buffer may be full when disk resizer 302 has stored approximately 128 KB of media content data and other metadata in the current buffer). In an embodiment, when the current buffer is full, a disk resizer 302 sends the full buffer to a clip cache 306 for further processing.

Depending on an amount of space allocated for each buffer, a significant amount of time may elapse before disk resizer 302 is able to store enough data to fill a current buffer, particularly for media content streams with a low bit rate (e.g., radio rebroadcasts). Because other processing elements of the media content pipeline 300 may await receipt of full buffers from disk resizer 302 for further processing (e.g., to store the buffer to disk or stream the buffer to a client device), the amount of time it takes to fill a buffer for low bit rate streams may cause undesirable processing delays.

In one embodiment, in order to ensure that buffers used by a disk resizer 302 are pushed to the rest of the media content pipeline 300 in a timely manner, non-full buffers may be allowed. For example, if the fixed size of each buffer in a media content pipeline 300 is 128 KB, disk resizer 302 may be enabled to fill one or more buffers with less than 128 KB of media content data and to fill the remaining space with "padding" if one or more conditions are reached. In this context, padding generally refers to any non-media content data that is used to occupy space in the buffer so that the buffer is filled to the fixed data size. One example of a condition that may be checked to determine whether a disk resizer 302 pads a buffer may include reaching a threshold time limit (e.g., 100 ms). For example, a disk resizer 302 may track an amount of time taken to fill each particular buffer and, if the current buffer is not filled within the threshold time limit, disk resizer 302 may fill the buffer with padding and send the padded buffer to the rest of the system for processing.

As indicated above, a media device 102 may concurrently receive a plurality of media content streams for processing. For example, a media device 102 may include multiple tuners that can concurrently receive separate media content input streams. In an embodiment, a media device 102 may concurrently receive the plurality of media content streams from input module 202 and process each of the plurality of media content streams as a separate pipeline. For example, as separate media content input streams are received, a disk resizer 302 may create a separate set of buffers from the same or separate memory pools for each of the separate media content input streams.

A clip cache 306 receives full buffers from a disk resizer 302 and maintains the full buffers in a queue. The queue of buffers managed by a clip cache 306 may be maintained, for example, as a cache file on a storage medium, such as memory 212.

In one embodiment, the buffers in the queue are queued for encryption. The buffers may be encrypted for a number of reasons, including for security of copyrighted media content received by the media device. For example, content owners are often concerned about unauthorized copying of media content and, thus, a media content pipeline may encrypt media content to make it more difficult to illegally transfer copyrighted media content from one media device to another. Any number of security systems and encryption schemes may be used to encrypt media content received by a media device 102 and to ensure that a media device 102 is able to transfer copyrighted content only to other authorized devices. Examples of security systems that may be used to secure media content for storage and/or transmission are further described in U.S. application Ser. No. 10/741,596, owned by the Applicant, which is incorporated by reference as though originally disclosed herein.

In one embodiment, a clip cache 306 queues unencrypted buffers for encryption until it is determined that one or more buffers in the queue have reached an "encryption limit." An encryption limit generally may refer to a configurable condition or threshold that, when triggered, causes unencrypted buffers queued by the clip cache 306 to be encrypted. For example, one encryption limit could be configured such that an unencrypted buffer is encrypted each time a new unencrypted buffer is received from disk resizer 302. However, because the process of encrypting buffers may include setting up encryption keys, using the keys to encrypt the data, etc., individually encrypting each new buffer received from the disk resizer 302 may significantly degrade performance of the media device, particularly for media content streams with high bit rates.

As another example, an encryption limit may be based on a time limit where a clip cache 306 queues unencrypted buffers received from disk resizer 302 and sends one or more queued buffers for encryption on a periodic schedule, for example, once every 100 ms or based on any other increment of time. By using an encryption limit based on a periodic time schedule, even if the bitrate of the media content stream is very high, the media content pipeline 300 may perform approximately the same number of encryptions within a given time frame.

As yet another example, a clip cache 306 may be configured with an encryption limit based on a particular number of unencrypted buffers currently queued for encryption by the clip cache 306. For example, a clip cache 306 may only be allocated memory space sufficient to queue a certain number of unencrypted buffers at any given time. Thus, clip cache 306 may receive unencrypted buffers from a disk resizer 302 until the number of buffers available to clip cache 306 is full, at which time the clip cache 306 sends the buffers to a clip file 308 to be encrypted.

In an embodiment, a clip file 308 receives unencrypted buffers from a clip cache 306 as input, causes the unencrypted buffers to be encrypted (e.g., by sending the buffers to an encryption engine), and sends the encrypted buffers to a clip write cache 310. A wide variety of cryptography techniques or security schemes may be used to encrypt the buffers including, without limitation, the Data Encryption Standard (DES), the Advanced Encryption Standard (AES), cryptographic hash functions such as MD5, SHA-1, SHA-2, SHA-3, private and public keys, etc. A cryptography technique as described herein may be implemented in hardware, software, or a combination of the two.

In an embodiment, some or all of the buffers in a clip cache 306 may not be encrypted by a clip file 308, and instead the clip cache 306 may send buffers to the clip write cache 310 without encrypting the data. For example, some buffers may not be stored in secondary storage in an encrypted state because copy protection is unnecessary for the particular content. As another example, some media content received by a clip file 308 may have been previously encrypted by the content source or other intermediary and, thus, the clip cache 306 can send the pre-encrypted buffer data to the clip write cache 310 without encrypting the data.

In an embodiment, a clip write cache 310 receives encrypted buffers from a clip file 308 and maintains the buffers in an encrypted buffer cache. The encrypted buffer cache generally represents a set of encrypted buffers stored in primary memory of the media device that are queued for writing to secondary storage of a media device. The encrypted buffer cache may also be used to satisfy requests to play or stream a media content stream for any play position in the media content stream that is currently stored in the encrypted buffer cache. For example, because the encrypted buffer cache stores encrypted media content data recently received from input module 202 and before writing the media content data to disk, a media device may play or stream encrypted buffers from the encrypted buffer cache to requesting client devices if the requested play point is at or near the live point. As used herein, the live point refers to the most current point in a media content stream. For example, the live point for a live broadcast generally refers to the most recently broadcasted part of the stream. By satisfying requests from the media device and/or client devices from the encrypted buffer cache when possible, a media content pipeline 300 may write the encrypted buffers to storage 210 less frequently without impeding access to the data stored in the buffers. In an embodiment, a clip write cache 310 maintains encrypted buffers in the encrypted buffer cache until the buffers are written to disk and have exceeded a specified time threshold for maintaining the buffers in the cache.

In an embodiment, a process periodically checks for encrypted buffers stored in the encrypted buffer cache that have not yet been written to disk and writes the buffers to disk if one or more thresholds are met. Example thresholds for writing the encrypted buffers to disk may include a limit on the number of unwritten buffers currently stored in the cache, and a length of time one or more unwritten buffers have been stored in the cache. If the process detects that a threshold is reached, the process retrieves the encrypted buffers that have not been written to secondary storage and writes them to secondary storage.

In an embodiment, the encrypted buffers that have been written to secondary storage are marked in the cache to indicate that the buffers have been stored; however, the stored buffers may remain in the encrypted buffer cache for a period of time before the space allocated for the buffers is deallocated and made available to other pipeline components. During this time, the buffers may remain available to satisfy incoming requests for the buffers (e.g., from the media device or a streaming client) directly from the encrypted buffer cache until the buffers are "expired." In an embodiment, clip write cache 310 may cause buffers that have been written to disk to "expire" after a certain period of time has passed, the buffers are no longer in use, or based on any other conditions. Once the buffers have been expired, the space allocated for the buffers may be deallocated and returned to an associated memory pool. For example, the deallocated space may return to a memory pool associated with the clip write cache 310 and used to store other incoming data from a clip file 308. As another example, the deallocated buffer space may be made available to a memory pool used by transform 304 to allocate buffers.

In an embodiment, a clip write cache 310 may be used by a separate transcoding pipeline to efficiently stream media content to client devices. For example, a transcoding pipeline that delivers HLS streams to client devices may access buffers stored in the clip write cache 310, transcode the buffers, and send the transcoded media content to client devices, rather than waiting to transcode the media content near the live play point from secondary storage.

5.0 Implementation Examples

5.1 Media Content Processing

Figure 4:
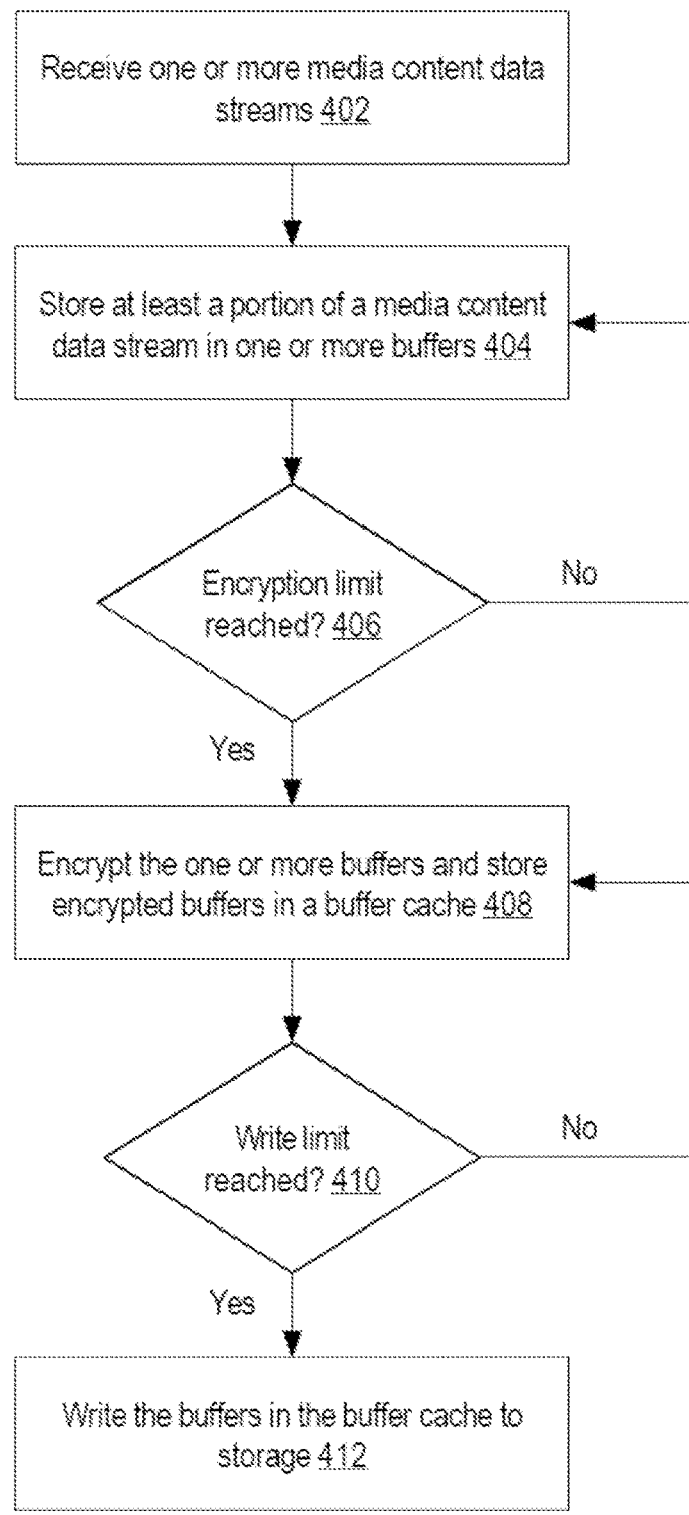
FIG. 4 illustrates an example process flow for processing media content using a media content pipeline, in accordance with one or more embodiments.

FIG. 4 illustrates an example process flow for processing media content using a media content pipeline in accordance with one or more embodiments. The various elements of flow 200 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Steps shown in FIG. 4 may be rearranged or omitted. Furthermore, additional steps not shown in FIG. 4 may be performed in accordance with one or more embodiments. Accordingly, the selection or arrangement of steps shown in FIG. 4 should not be construed as limiting.

At block 402, one or more media content data streams are received by a media device. For example, a media device 102 may receive one or more media content data streams from content sources 106 using one or more tuners of the media device. A media device 102 may receive a single media content data stream or receive a plurality of media content data streams simultaneously. For example, a user of a media device 102 may be playing multiple programs and/or recording multiple programs simultaneously. As another example, a media device 102 may be receiving multiple content streams for streaming to one or more client devices 104.

At block 404, at least a portion of a media content data stream is stored in one or more in-memory buffers. For example, for each media content data stream received by a media device 102, the media device 102 may store portions of the media content stream in one or more buffers stored in memory 212. In an embodiment, the buffers created by media device 102 to store the portion of the media content data stream may be queued for further processing by the media device 102.

At block 406, it is determined whether an encryption limit is reached for the one or more in-memory buffers. As described above in reference to the example media content pipeline illustrated in FIG. 3, media content stream data may be received by a media device 102 and initially segmented and stored in one or more unencrypted buffers. For security and other reasons, media device 102 may encrypt the buffers before storing the buffers to storage 210 or sending the media content data to a client device 104. In an embodiment, determining whether an encryption limit is reached for the one or more in-memory buffers may include determining that a particular time limit has been reached, or that a certain number of unencrypted buffers are currently queued for encrypting.

At block 408, the media device encrypts the one or more in-memory buffers and stores the encrypted buffers in a buffer cache. For example, media device 102 may encrypt the buffers using any number of cryptography techniques implemented by hardware, software, or combinations thereof. Media device 102 may store the encrypted buffers in clip write cache 310 which queues the encrypted buffers for further processing, including writing the encrypted buffers to storage 210. In an embodiment, encrypted buffers in clip write cache 310 further may be available for reading by an output module 206 and/or a streaming module 214.

At block 410, the media device determines whether a write limit has been reached for the one or more buffers stored in the encrypted buffer cache. For example, determining whether a write limit is reached for one or more buffers stored in the encrypted buffer cache may include determining whether a particular time limit has been reached, or whether a certain number of encrypted buffers are currently stored in the encrypted buffer cache and have not yet been written to storage.

If, in block 410, the media device determines that a write limit has not been reached, then, in block 408, the media device may continue to receive, encrypt, and store newly encrypted buffers in the encrypted buffer cache.

If, at block 410, the media device determines that a write limit is reached for one or more encrypted buffers stored in the encrypted buffer cache, then the media device writes one or more of the encrypted buffers stored in the buffer cache to storage at block 412. For example, media device 102 may write the buffers to storage 210. In an embodiment, writing the buffers to storage 210 may include modifying a value associated with the buffers stored in memory 212 to indicate that the buffers have been written to storage 210.

5.2 Playing Media Content at a Media Device

Among other features, media devices 102 are configured to receive and process requests to play media content. For example, a user may request that a media device 102 play particular media content that the media device receives from a content source 106 using one or more tuners of the media device. As another example, a separate client device may request to play content that is streamable from a separate media device 102. In one embodiment, the requested media content stream may be received and processed by the media device using a media content pipeline, such as media content pipeline 300 described above.

Conceptually, a user may request that a media content stream be played at one of three time periods relative to the media content stream as a whole: (1) at the live or most current play point in the stream; (2) at a play point that is behind but still near the live play point (e.g., where the buffers for the play point may still be stored in a cache managed by the media content pipeline); and (3) at a play point that is not near the live play point (e.g., where the buffers for the play point have been processed by the media content pipeline, written to disk, and are no longer stored in a cache maintained by the media content pipeline). In an embodiment, a media content pipeline may provide the data to an output module 206 and/or streaming module 214 to play a media content stream at a media device from different sources depending on where in the content stream the user has requested playing of the media content stream.

In one embodiment, if a user requests to play a media content stream at or near the live point in a media content stream, the media device may access the data for the media content stream in any of a number of different modes, each of which may or may not bypass processing of the media content stream by the media content pipeline described herein.

As one example, when playing at or near the live point, an output module 206 may directly read data received by an input module 202. The data received by the input module 202 may still be processed and otherwise managed by the components of the media content pipeline as described above, however, the output module 206 may access the data directly from the input module 202 instead of from a clip write cache 310 or other component of the pipeline. However, because the input module 202 may be limited in the amount of space available to store incoming data streams, the ability to retrieve data for a media content stream directly from the input module 202 may work only for requests to play the media content stream at or very near the live play point. Further, the size of memory set aside for an input module may be reduced and used for other portions of the system if a media device is disallowed from accessing the data directly from the input module.

As another example, an input module 202 may receive and encode media content from a content source and store the encoded media content data in a section of memory set aside for the input module 202. Further, the section of memory set aside for the input module 202 may be directly accessible by an output module 206 using DMA or other techniques. In this example, the data read by the output module 206 from the input module 202 may bypass the media content pipeline entirely. In some contexts, this process may be referred to as a "live decode" of the media content data.

As yet another example, the output module 206 may read data at or near the live point from in-memory buffers managed by a clip write cache 310. In general, any of the one or more modes of reading and playing media content at or near the live point may be used, for example, depending on exactly how far the current play point is from the live point. Furthermore, various combinations of the modes may be used in particular implementations and may co-exist within the same implementation.

As indicated above, a request received by a media device to play a media content stream at or near the live play point in the media content stream instead may be satisfied at least in part by data stored in one or more buffers in a cache managed by a media content pipeline. For example, program logic of the media device may be configured to retrieve the data for playback from either the cache or from disk depending on how far back the requested play point is within the media content stream and what portion of the media content stream is currently stored in the cache.

In one embodiment, a request for a play point within a media content stream may be received by a control object of the media content pipeline that calls a function returning one or more buffers storing the data for the requested play point. The function may first check if the buffers storing the data for the requested play point are available in a list of encrypted buffers (e.g., in the clip write cache 310) maintained by the media content pipeline for the media content stream. For example, the function may check whether the play point is available in the list of buffers using a time stamp or a buffer order number associated with the request. If the requested one or more buffers are available in the list of encrypted buffers, the buffers may be decrypted from memory and returned as decrypted buffers to an output module for decoding and display.

If the buffers for the requested play point are not available in the list of encrypted buffers (e.g., because the buffers have already been written to disk and have expired from the cached list of buffers), then the function may instead retrieve the buffers from disk storage. Because the media content pipeline processes and stores the buffers in the encrypted buffer cache and on disk as uniform sized buffers, the buffers returned from either the cache or disk may be similarly processed by an output module for displaying the content.

In general, the transition playing content from one source to another (e.g., from secondary storage to the memory cache, or from the memory cache to DMA) is seamless and not detectable to a user viewing the media content (e.g., there is no interruption or glitches in the content played to the user).

5.3 Media Content Streaming

Figure 5:
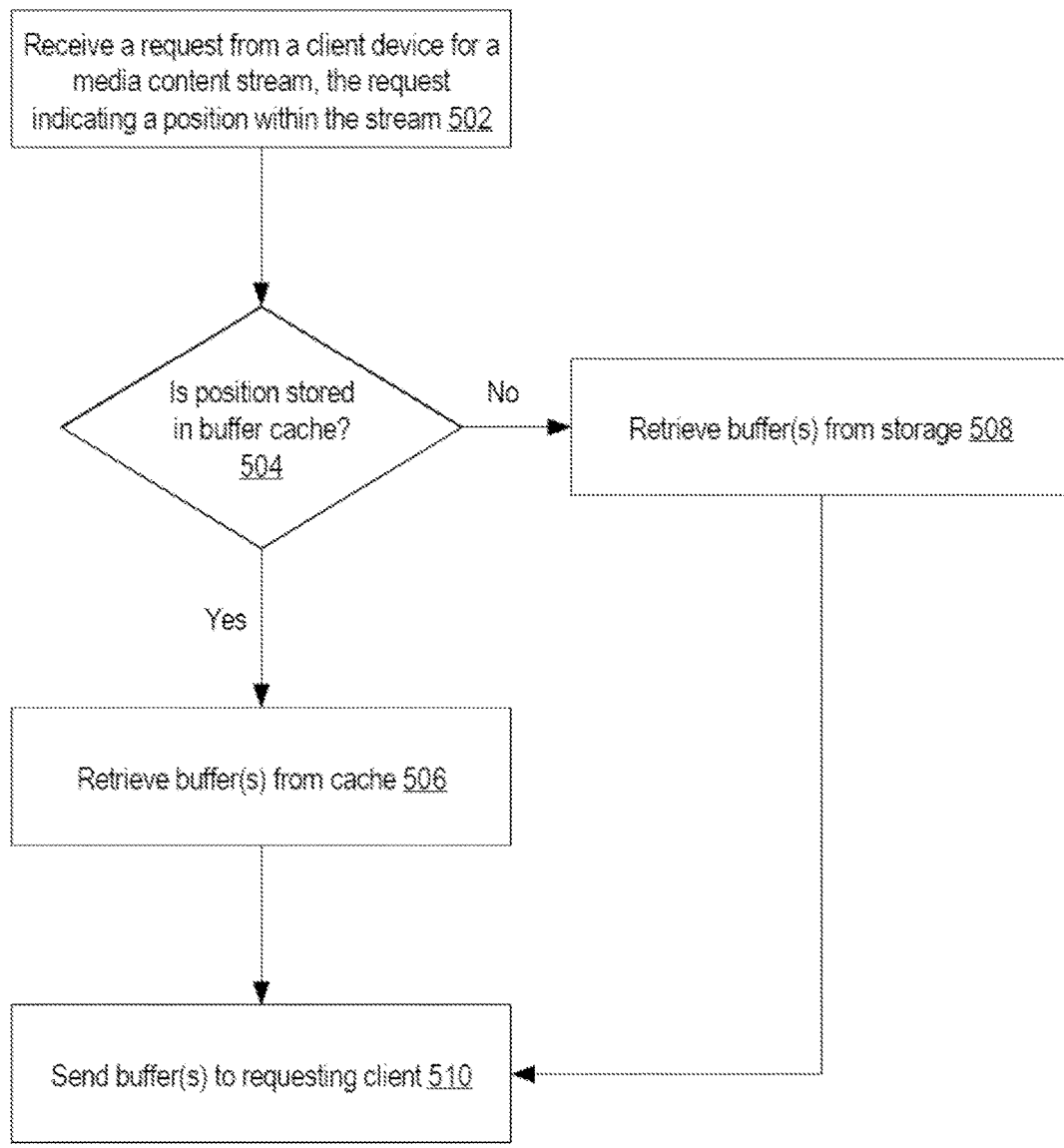
FIG. 5 illustrates an example process flow for streaming media content to one or more client devices, in accordance with one or more embodiments.

FIG. 5 illustrates a flow chart for streaming media content from a media device to one or more client devices, in accordance with one or more embodiments. Steps shown in FIG. 5 may be rearranged or omitted. Furthermore, additional steps not shown in FIG. 5 may be performed in accordance with one or more embodiments. Accordingly, the selection or arrangement of steps shown in FIG. 5 should not be construed as limiting. In an embodiment, one or more of the steps shown in FIG. 5 may be performed concurrently with the steps of the example flow chart illustrated in FIG. 4. For example, a media device may receive, encrypt, and store one or more media content data streams, as illustrated by the example flow chart of FIG. 4, and concurrently receive requests from one or more client devices to send media content data streams to the client devices.

At block 502, a request is received by a media device from a client device for a media content stream. For example, a client device 104 may be configured to present screen displays and to receive user commands from a user selecting particular media content items for playing at the client device. For example, a user may navigate screen displays to obtain information about media content items of interest to the user, and to play selected media content items. Information about available media content items may be obtained by the client device 104 from a media device 102 and/or a service provider 108.

Information about available media content items may comprise addresses (e.g., channels, Universal Resource Locators, file names, media data databases, media servers, media distribution systems, etc.) from which media content items may streamed or otherwise accessed. Available programming information as described herein may include availability information of media programs that may be received via a media device 102. For example, a client device 104 may request a live television broadcast that may not be stored on a media device 102 but that a media device 102 may receive via a tuner of the media device. To receive the requested broadcast, the media device 102 may allocate one of one or more tuners to receive the live broadcast, process the received media content (e.g., as described above in reference to FIG. 4), and stream the content to the requesting client device 104. In some embodiments, multiple media content streams may be concurrently streamed by a media device 102 to one or more different client devices 104.

In an embodiment, the request may be generated by a client device 104 and received by a streaming module 214 of a media device 102 which coordinates access to the requested media content stream. The request may specify a position within the media content stream, which may depend in part on user input received at the client device. For example, a user of a client device 104 may navigate a menu and select a particular channel for playing at a live point. In this example, the client device 104 sends a request to a media device 102 for the media content stream of the selected channel and indicating the current live point in the media content stream as the requested position in the stream. As another example, subsequent to a user selecting a particular channel for viewing, a user of client device 104 may provide input at the client device 104 to rewind, pause, or to play selected media content at a play point other than the live play point. In this example, the specified position may be some point within the media content stream that precedes the live play point. In an embodiment, a position within a media content stream may be specified by a timestamp, buffer ordering value, or any other value that indicates a position within a media content stream.

At block 504, the media device determines whether a buffer of the media content stream corresponding to the specified position within the media content stream currently is stored in the in-memory buffer cache. Determining whether the specified position within the media content stream currently is stored in the buffer cache may include comparing the value representing the specified position with metadata or other information stored in association with the buffers in the buffer cache.

If, at block 504, the media device determines that a buffer corresponding to the requested position is currently stored in the buffer cache, the media device retrieves the buffer, and possibly one or more surrounding buffers, from the buffer cache. If, at block 504, the media device determines that the buffer corresponding to the requested position is not stored in the buffer cache, the media device retrieves the buffer and possibly one or more surrounding buffers from storage. For example, a media device 102 may have already written the buffer corresponding to the specified position to storage 210 and released the buffer from memory 212. In this case, media device 102 may retrieve the buffer from storage 210 instead of memory 212.

At block 510, the media device sends the one or more buffers to the client device. For example, a streaming module 214 of a media device 102 may receive the one or more buffers from media content pipeline 300 and send the one or more buffers to a client device 104 via one or more wired or wireless network links. The media device 102 may send the one or more buffers directly to the requesting client device 104, or the one or more buffers may be delivered to the client device 104 via one or more intermediary devices.

The example process flows of FIG. 4 and FIG. 5 illustrate use of a media content pipeline to play media content items at a media device and/or to stream media content items to client devices. In an embodiment, any number of media devices and/or client devices can concurrently play and/or stream the same media content item, and each device may play or stream the media content item from a different play point. For example, a media device may receive and process a media content stream using the media content pipeline described herein and concurrently play the media content stream to an output device from buffers stored in a memory cache. At the same time, a first client device may play the same media content stream from the same play point and stream the media content from the same point in the memory cache as the media device. Further, a second client device may concurrently play the same media content stream from a different play point (e.g., 10 minutes behind the play point of the media device and first client device) and stream the media content from a different play point, whether from a different portion of the memory cache or from secondary storage.

In one embodiment, a host media device may manage a number of different play points for separate devices by maintaining a "reading context" for each media device and client device playing from the same media content stream. For example, for each client device streaming a particular media content stream from a host media device, the host media device may track a current read position for that client device, which may include a reference to a buffer in the memory cache or a location in secondary storage. A host media device may also store information indicating which buffers are currently in use by particular client devices and other state information.

In an embodiment, in response to a client device accessing a buffer stored in the buffer cache, the media device may "hold" the buffer and wait to release the buffer from the memory cache until it is determined that any and all media devices/client devices have stopped accessing the buffer. For example, if both a media device and a client device streaming media content from the media device are currently accessing the same buffer, the media device may store a "ref count" or other value that indicates that both of the devices are currently accessing the buffer. When each of the devices stops accessing the buffer, the ref count may be decreased until no devices are currently accessing the buffer, at which time the media device may release the buffer from the memory cache. In this manner, when multiple devices access the same buffer in the memory cache, generally only one copy of the buffer exists in the cache and may persist in the cache until a time after all devices have stopped accessing the buffer.

Embodiments include a computer readable storage medium, storing software instructions, which when executed by one or more processors cause performance of any one of the foregoing methods.

Embodiments include an apparatus comprising a processor and configured to perform any one of the foregoing methods.

Note that, although separate embodiments are discussed herein, any combination of embodiments and/or partial embodiments discussed herein may be combined to form further embodiments thereof.

6.0 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, flash disk, etc., is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

7.0 Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, by a media device, a plurality of media content data streams;
   storing, in one or more in-memory buffers, at least a portion of a particular media content stream of the plurality of media content data streams;
   prior to the one or more in-memory buffers becoming full by the storage of the at least the portion of the particular media content stream, transferring content from the one or more in-memory buffers to a secondary storage device in response to determining that an amount of time since the portion of the particular media content stream started being stored in the one or more buffers exceeds a threshold amount of time;
   determining whether on or more in-memory buffers have reached an encryption limit, wherein the encryption limit is one or more of a time limit, and a number of unencrypted in-memory buffers currently stored;
   in response to determining that on or more in-memory buffers have reached an encryption limit, encrypting the one or more in-memory buffers;
   receiving, from a client device, a request for the particular media content stream, the request indicating a position within the particular media content stream; and in response to determining that the position within the particular media content stream corresponds to a particular buffer of the one or more in-memory data buffers, sending the particular buffer to the client device.

2. The method as recited in claim 1, further comprising, subsequent to encrypting the one or more in-memory buffers, storing the one or more in-memory buffers to a secondary storage device.

3. The method as recited in claim 2, wherein the one or more in-memory buffers are stored at the secondary storage device in response to determining that a write limit is reached, wherein the write expiration limit is one or more of a time limit and a number of in-memory data buffers currently stored.

4. The method as recited in claim 1, further comprising storing the one or more in-memory buffers to a secondary storage device without encrypting the one or more in-memory buffers.

5. The method of claim 1, wherein the position within the particular media content stream is indicated by one or more of a buffer order number and a timestamp.

6. The method as recited in claim 1, wherein the one or more in-memory buffers are a uniform size.

7. The method as recited in claim 1, wherein at least one buffer of the one or more in-memory buffers is padded with non-media content data.

8. A non-transitory computer readable medium storing a program of instructions that is executable by a device to perform a method, the method comprising:
  receiving, by a media device, a plurality of media content data streams;
  storing, in one or more in-memory buffers, at least a portion of a particular media content stream of the plurality of media content data streams;
  prior to the one or more in-memory buffers becoming full by the storage of the at least the portion of the particular media content stream, transferring content from the one or more in-memory buffers to a secondary storage device in response to determining that an amount of time since the portion of the particular media content stream started being stored in the one or more buffers exceeds a threshold amount of time;
  determining whether one or more in-memory buffers have reached an encryption limit, wherein the encryption limit is one or more of a time limit and a number of in-memory buffers currently stored;
  in response to determining that one or more in-memory buffers have reached an encryption limit, encrypting the one or more in-memory buffers;
  receiving, from a client device, a request for the particular media content stream, the request indicating a position within the particular media content stream; and
  in response to determining that the position within the particular media content stream corresponds to a particular buffer of the one or more in-memory data buffers, sending the particular buffer to the client device.

9. The non-transitory computer readable medium as recited in claim 8, further comprising:
  subsequent to encrypting the one or more in-memory buffers, storing the one or more in-memory buffers at a secondary storage device.

10. The non-transitory computer readable medium as recited in claim 8, wherein the one or more in-memory buffers are stored at the secondary storage device in response to determining that a write expiration limit is reached, wherein the write expiration limit is one or more of a time limit and a number of in-memory data buffers currently stored.

11. The non-transitory computer readable medium as recited in claim 8, further comprising storing the one or more in-memory buffers to a secondary storage device without encrypting the one or more in-memory buffers.

12. The non-transitory computer readable medium as recited in claim 8, wherein the position within the particular media content stream is indicated by one or more of a buffer order number and a timestamp.

13. The non-transitory computer readable medium as recited in claim 8, wherein the one or more in-memory buffers are of a uniform size.

14. The non-transitory computer readable medium as recited in claim 8, wherein at least one buffer of the one or more in-memory buffers is padded with non-media content data.

15. An apparatus, comprising:
  a subsystem, implemented at least partially in hardware, that receives a plurality of media content data streams;
  a subsystem, implemented at least partially in hardware, that stores, in one or more in-memory buffers, at least a portion of a particular media content stream of the plurality of media content data streams;
  a subsystem, implemented at least partially in hardware, that prior to the one or more in-memory buffers becoming full by the storage of the at least the portion of the particular media content stream, transfers content from the one or more in-memory buffers to a secondary storage device in response to determining that an amount of time since the portion of the particular media content stream started being stored in the one or more buffers exceeds a threshold amount of time;
  a subsystem, implemented at least partially in hardware, that determines whether one or more in-memory buffers have reached an encryption limit, wherein the encryption limit is one or more of a time limit and a number of unencrypted in-memory buffers currently stored;
  a subsystem, implemented at least partially in hardware that, in response to determining that one or more in-memory buffers have reached an encryption limit, encrypts the one or more in-memory buffers;
  a subsystem, implemented at least partially in hardware, that receives, from a client device, a request for the particular media content stream, the request indicating a position within the particular media content stream;
  a subsystem, implemented at least partially in hardware, that, in response to determining that the position within the particular media content stream corresponds to a particular buffer of the one or more in-memory data buffers, sends the particular buffer to the client device.

16. The apparatus as recited in claim 15, further comprising:
  a subsystem, implemented at least partially in hardware, that, subsequent to encrypting the one or more in-memory buffers, stores the one or more in-memory buffers at a secondary storage device.

17. The apparatus as recited in claim 15, further comprising storing the one or more in-memory buffers to a secondary storage device without encrypting the one or more in-memory buffers.

18. The apparatus as recited in claim 15, wherein the one or more in-memory buffers are stored at the secondary storage device in response to determining that a write limit is reached, wherein the write expiration limit is one or more of a time limit and a number of encrypted in-memory data buffers currently stored.

19. The apparatus as recited in claim 15, wherein the position within the particular media content stream is indicated by one or more of a buffer order number and a timestamp.

20. The apparatus as recited in claim 15, wherein the one or more in-memory buffers are of a uniform size.

21. The apparatus as recited in claim 15, wherein at least one buffer of the one or more in-memory buffers is padded with non-media content data.

\* \* \* \* \*